(12) United States Patent
Da Costa Paiva et al.

(10) Patent No.: US 9,014,982 B2
(45) Date of Patent: Apr. 21, 2015

(54) METHOD FOR ANALYSIS OF RELEVANCE AND INTERDEPENDENCIES IN GEOSCIENCE DATA

(71) Applicants: Antonio Da Costa Paiva, Spring, TX (US); Matthew Casey, Houston, TX (US)

(72) Inventors: Antonio Da Costa Paiva, Spring, TX (US); Matthew Casey, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/376,874

(22) PCT Filed: Mar. 15, 2013

(86) PCT No.: PCT/US2013/032549
§ 371 (c)(1),
(2) Date: Aug. 6, 2014

(87) PCT Pub. No.: WO2013/176771
PCT Pub. Date: Nov. 28, 2013

(65) Prior Publication Data
US 2015/0066369 A1 Mar. 5, 2015

Related U.S. Application Data

(60) Provisional application No. 61/650,927, filed on May 23, 2012.

(51) Int. Cl.
*G01V 1/28* (2006.01)
*G01V 99/00* (2009.01)
*G06F 11/00* (2006.01)

(52) U.S. Cl.
CPC .................................. *G01V 99/00* (2013.01)

(58) Field of Classification Search
CPC ............................. G01V 11/00; G01V 1/345
USPC ..................................... 702/2, 5, 13, 14, 16
See application file for complete search history.

(56) References Cited

U.S. PATENT DOCUMENTS

| | | |
|---|---|---|
| 4,916,615 A | 4/1990 | Chittineni |
| 4,992,995 A | 2/1991 | Favret |
| 5,047,991 A | 9/1991 | Hsu |
| 5,265,192 A | 11/1993 | McCormack |
| 5,274,714 A | 12/1993 | Hutcheson et al. |

(Continued)

FOREIGN PATENT DOCUMENTS

| | | |
|---|---|---|
| WO | WO 99/64896 | 12/1999 |
| WO | WO 2005/017564 | 2/2005 |

OTHER PUBLICATIONS

Duda, R. et al. (2000), "Pattern Classification," Wiley, $2^{nd}$ Ed., Chapter 4.

(Continued)

*Primary Examiner* — Phuong Huynh
(74) *Attorney, Agent, or Firm* — ExxonMobil Upstream Research Company Law Dept.

(57) ABSTRACT

A computer-implemented method for evaluating a geoscience data analysis question. The user inputs the question to the computer through a graphical user interface or a text command interface (11). The computer is programmed to derive a statistical measure for evaluating the question (12). One or more data elements (14) are inputted to the computer, and the derived statistical measure is applied to the data elements and computed (13).

20 Claims, 5 Drawing Sheets

(56) References Cited

U.S. PATENT DOCUMENTS

| | | | |
|---|---|---|---|
| 5,416,750 | A | 5/1995 | Doyen et al. |
| 5,444,619 | A | 8/1995 | Hoskins et al. |
| 5,465,308 | A | 11/1995 | Hutcheson et al. |
| 5,539,704 | A | 7/1996 | Doyen et al. |
| 5,586,082 | A | 12/1996 | Anderson et al. |
| 5,677,893 | A | 10/1997 | de Hoop et al. |
| 5,841,735 | A | 11/1998 | Quazi |
| 5,852,588 | A | 12/1998 | de Hoop et al. |
| 5,940,777 | A | 8/1999 | Keskes |
| 5,982,934 | A | 11/1999 | Villalba |
| 6,052,650 | A | 4/2000 | Assa et al. |
| 6,226,596 | B1 | 5/2001 | Gao |
| 6,236,942 | B1 | 5/2001 | Bush |
| 6,295,504 | B1 | 9/2001 | Ye et al. |
| 6,363,327 | B1 | 3/2002 | Wallet et al. |
| 6,411,903 | B2 | 6/2002 | Bush |
| 6,466,923 | B1 | 10/2002 | Young |
| 6,473,696 | B1 | 10/2002 | Onyia et al. |
| 6,526,353 | B2 | 2/2003 | Wallet et al. |
| 6,574,565 | B1 | 6/2003 | Bush |
| 6,574,566 | B2 | 6/2003 | Grismore et al. |
| 6,618,678 | B1 | 9/2003 | Van Riel |
| 6,625,541 | B1 | 9/2003 | Shenoy et al. |
| 6,725,163 | B1 | 4/2004 | Trappe et al. |
| 6,735,526 | B1 | 5/2004 | Meldahl et al. |
| 6,751,558 | B2 | 6/2004 | Huffman et al. |
| 6,754,380 | B1 | 6/2004 | Suzuki et al. |
| 6,754,589 | B2 | 6/2004 | Bush |
| 6,757,614 | B2 | 6/2004 | Pepper et al. |
| 6,771,800 | B2 | 8/2004 | Keskes et al. |
| 6,801,858 | B2 | 10/2004 | Nivlet et al. |
| 6,804,609 | B1 | 10/2004 | Brumbaugh |
| 6,829,570 | B1 * | 12/2004 | Thambynayagam et al. .. 703/10 |
| 6,847,895 | B2 | 1/2005 | Nivlet et al. |
| 6,882,997 | B1 | 4/2005 | Zhang et al. |
| 6,941,228 | B2 | 9/2005 | Toelle |
| 6,950,786 | B1 | 9/2005 | Sonneland et al. |
| 6,957,146 | B1 | 10/2005 | Taner et al. |
| 6,970,397 | B2 | 11/2005 | Castagna et al. |
| 6,977,866 | B2 | 12/2005 | Huffman et al. |
| 6,988,038 | B2 | 1/2006 | Trappe et al. |
| 7,006,085 | B1 | 2/2006 | Acosta et al. |
| 7,053,131 | B2 | 5/2006 | Ko et al. |
| 7,092,824 | B2 | 8/2006 | Favret et al. |
| 7,098,908 | B2 | 8/2006 | Acosta et al. |
| 7,162,463 | B1 | 1/2007 | Wentland et al. |
| 7,184,991 | B1 | 2/2007 | Wentland et al. |
| 7,188,092 | B2 | 3/2007 | Wentland et al. |
| 7,203,342 | B2 | 4/2007 | Pederson |
| 7,206,782 | B1 | 4/2007 | Padgett |
| 7,222,023 | B2 | 5/2007 | Laurent et al. |
| 7,243,029 | B2 | 7/2007 | Lichman et al. |
| 7,248,258 | B2 | 7/2007 | Acosta et al. |
| 7,248,539 | B2 | 7/2007 | Borgos et al. |
| 7,266,041 | B1 | 9/2007 | Padgett |
| 7,295,706 | B2 | 11/2007 | Wentland et al. |
| 7,295,930 | B2 | 11/2007 | Dulac et al. |
| 7,308,139 | B2 | 12/2007 | Wentland et al. |
| 7,453,766 | B1 | 11/2008 | Padgett |
| 7,453,767 | B1 | 11/2008 | Padgett |
| 7,463,552 | B1 | 12/2008 | Padgett |
| 7,502,026 | B2 | 3/2009 | Acosta et al. |
| 7,502,691 | B2 | 3/2009 | Romero |
| 7,598,487 | B2 * | 10/2009 | Qian et al. .................... 250/282 |
| 7,658,202 | B2 | 2/2010 | Wiley et al. |
| 7,697,373 | B1 | 4/2010 | Padgett |
| 7,869,955 | B2 | 1/2011 | Zhang et al. |
| 7,881,501 | B2 | 2/2011 | Pinnegar et al. |
| 7,970,545 | B2 | 6/2011 | Sanstrom |
| 8,010,294 | B2 | 8/2011 | Dorn et al. |
| 8,027,517 | B2 | 9/2011 | Gauthier et al. |
| 8,055,026 | B2 | 11/2011 | Pedersen |
| 8,065,088 | B2 | 11/2011 | Dorn et al. |
| 8,121,969 | B2 | 2/2012 | Chan et al. |
| 8,128,030 | B2 | 3/2012 | Dannenberg |
| 8,219,322 | B2 | 7/2012 | Monsen et al. |
| 8,229,950 | B2 | 7/2012 | Savary-Sismondini et al. |
| 8,326,542 | B2 | 12/2012 | Chevion et al. |
| 8,346,695 | B2 | 1/2013 | Pepper et al. |
| 8,352,190 | B2 | 1/2013 | Baumstein et al. |
| 8,358,561 | B2 | 1/2013 | Kelly et al. |
| 8,363,959 | B2 | 1/2013 | Boiman et al. |
| 8,380,435 | B2 | 2/2013 | Kumaran et al. |
| 8,385,603 | B2 | 2/2013 | Beucher et al. |
| 8,447,525 | B2 | 5/2013 | Pepper et al. |
| 8,463,551 | B2 | 6/2013 | Aarre |
| 8,515,678 | B2 | 8/2013 | Pepper et al. |
| 2003/0208322 | A1 | 11/2003 | Aoki et al. |
| 2005/0137274 | A1 | 6/2005 | Ko et al. |
| 2005/0171700 | A1 | 8/2005 | Dean |
| 2005/0288863 | A1 | 12/2005 | Workman |
| 2006/0115145 | A1 | 6/2006 | Bishop |
| 2006/0184488 | A1 | 8/2006 | Wentland |
| 2007/0067040 | A1 | 3/2007 | Ferree |
| 2008/0123469 | A1 | 5/2008 | Wibaux et al. |
| 2008/0270033 | A1 | 10/2008 | Wiley et al. |
| 2010/0161235 | A1 | 6/2010 | Ikelle |
| 2010/0174489 | A1 | 7/2010 | Bryant et al. |
| 2010/0186950 | A1 | 7/2010 | Neelamani et al. |
| 2010/0211363 | A1 | 8/2010 | Dorn et al. |
| 2010/0245347 | A1 | 9/2010 | Dorn et al. |
| 2010/0312477 | A1 | 12/2010 | Sanstrom et al. |
| 2011/0110192 | A1 | 5/2011 | Clavaud et al. |
| 2011/0119040 | A1 | 5/2011 | Mclennan |
| 2011/0297459 | A1 * | 12/2011 | Kumaran et al. ........ 166/250.01 |
| 2011/0307178 | A1 | 12/2011 | Hoekstra |
| 2012/0072116 | A1 | 3/2012 | Dorn et al. |
| 2012/0090001 | A1 | 4/2012 | Yen |
| 2012/0117124 | A1 | 5/2012 | Bruaset et al. |
| 2012/0150447 | A1 | 6/2012 | Van Hoek et al. |
| 2012/0195165 | A1 | 8/2012 | Vu et al. |
| 2012/0197530 | A1 | 8/2012 | Posamentier et al. |
| 2012/0197531 | A1 | 8/2012 | Posamentier et al. |
| 2012/0197532 | A1 | 8/2012 | Posamentier et al. |
| 2012/0197613 | A1 | 8/2012 | Vu et al. |
| 2012/0257796 | A1 | 10/2012 | Henderson et al. |
| 2012/0322037 | A1 | 12/2012 | Raglin |
| 2013/0006591 | A1 | 1/2013 | Pyrcz et al. |
| 2013/0138350 | A1 | 5/2013 | Thachaparambil et al. |
| 2013/0158877 | A1 | 6/2013 | Bakke et al. |

OTHER PUBLICATIONS

Edgar, J.A. et al. (2011), "How reliable is statistical wavelet estimation?," *Geophysics* 76(4), pp. V59-V68.

Liu, Q.H. et al. (2004), "Electrogmatnic/Seismic Joint Inversion in Multilayered Media," Duke University, MURI Review, pp. 29.

Kadambe, S. et al. (2003), "Sensor/Data Fusion Based on Value of Information," Proc. of the $6^{th}$ Intl. Con. On Information Fusion, 25-32.

Kato, A. (2009), "Information Entropy Monte Carlo Simulation," http://www.rpl.uh.edu/pdf/Chapter3_2_AYATO.pdf, 19 pgs.

Principe, J.C. (2010), "Information Theoretic Learning," Springer, Chapter 2, 45 pgs.

* cited by examiner

METHOD FOR ANALYSIS OF RELEVANCE AND INTERDEPENDENCIES IN GEOSCIENCE DATA

CROSS-REFERENCE TO RELATED APPLICATION

This application is the National Stage of International Application No. PCT/US2013/032549, that published as WO 2013/176771, filed 15 Mar. 2013, which claims the benefit of U.S. Provisional Application No. 61/650,927, filed 23 May 2012, each of which is incorporated herein by reference, in its entirety, for all purposes.

FIELD OF THE INVENTION

This disclosure relates generally to the field of geophysical prospecting and, more particularly, to the analysis of geoscience data, including meta-data. More specifically, this disclosure describes a method for analysis of dependencies, relevance and independent content within multi-dimensional or multi-attribute geophysical data.

BACKGROUND OF THE INVENTION

The analysis of earth science data often involves the simultaneous interpretation of data and its many derived attributes. An attribute of the data is a broadly defined term meaning any quantity computed or otherwise derived from the data, including the data themselves. The use of different data sources or types and of their derived attributes helps geophysicists to have a better understanding of the subsurface by providing alternative perspectives. The main drawback of this approach has been the increasing number of data elements (i.e., data sources or data sets, data types, or data attributes) because of the increasing number of alternative and complex scenarios that must be considered for analysis, which tends to overload geophysicists when they try to manually combine the different data elements into their interpretation.

Consider the following example. Suppose that an interpreter has a set of data elements that can help him/her locate or interpret certain geologic features, such as a channel. To locate the feature, however, the interpreter needs to look for the occurrence of a specific pattern, or patterns, manifested simultaneously across several of the data elements. In doing this manually, not only is it easy to overlook the occurrence of the feature, but it is hard to mentally keep track of what is happening in each data element simultaneously for several data elements, especially as the number of data elements increases. To make matters worse, if the computation of an attribute depends on a parameter, as is often the case, the interpreter has to either mentally manage this additional degree of complexity or, more commonly, fix the parameter for the attribute beforehand. In doing so, however, the parameter is chosen independently of the other attributes thus neglecting the potential relationship between the attribute and other data elements, which may call for the use of a different parameter value.

The example highlights a number of problems, such as the fact that geophysicists do not know beforehand whether a data element has the information they need, or if it is redundant because of other data elements already being considered, or if a given relationship between data elements exists and, if it does, where in the data, or which parameter value might be better to highlight a feature in a given set of data elements. For each of these problems, one can ask a specific question for which one can formulate, implement, and apply a specific measure or method to answer the question. Indeed, for specific questions and in very limited settings, a number of methods have been described in the literature. However, this approach is very cumbersome in a general paradigm because it is often impractical to exhaustively define in advance all measures needed to answer all the potential questions, or cope with an increasing number of data elements or attributes.

What is needed then is a general statistical analysis framework for dealing with the above-described technical problem. A number of methods have been reported in the published literature that address specific questions or perform an analysis in specific settings. The known methods employ a pre-defined statistical measure (even if multiple alternative measures are sometimes stated) to quantify the similarity between data elements. The pre-defined statistical measure of similarity is then used for a variety of analyses. Some examples include the following.

Attribute Selection

US Patent Application Publication No. 2011/0119040, "Attribute importance measure for parametric multivariate modeling," by J. A. McLennan, discloses a method to measure the importance and select the relevant attributes describing a subsurface formation. To measure the importance of the attributes, the author provides an attribute importance measure built from the matrix of correlation coefficients.

U.S. Pat. No. 7,502,691, "Method and computer program product for determining a degree of similarity between well log data," by P. A. Romero, discloses a method to determine the similarity between nuclear magnetic resonance (NMR) well log data and other well log recordings.

"Information entropy Monte Carlo simulation," by A. Kato (see online presentation at: http://www.rpl.uh.edu/pdf/Chapter3_2_AYATO.pdf), presents results on the use of information theoretic measures to assess the information conveyed about rock lithofacies by other attributes.

Evaluation of the Data Quality

US Patent Application Publication No. 2010/0312477, "Automated log quality monitoring systems and methods," by W. C. Sanstrom and R. E. Chemali, discloses a method to analyze the data quality of well log recordings involving the application of a comparison function to determine a log quality indicator.

Data Fusion

"Sensor/data fusion based on value of information," by S. Kadambe and C. Daniell, in Proc. of the 6th Intl. Conf. on Information Fusion, 25-32 (2003), also cited as paper "DOI: 10.1109/ICIF.2003.177422," describes a number of measures to assess the value of information from different data sources. That result is then used in deciding whether to combine the data source with other data sources.

Deriving a Model that Captures or Enhances Some Desired Characteristic of the Data US Patent Application Publication No. 2010/0161235, "Imaging of multishot seismic data," by L. T. Ikelle, discloses a method for imaging of the subsurface using multishot data without decoding, wherein the mutual information statistical measure is used to derive a model that separates different components of that data.

"How reliable is statistical wavelet estimation?," by J. A. Edgar and M. van der Baan, in *Geophysics* 76(4), pp. V59-V68 (2011), compares different statistical measures for estimation of the seismic wavelet model from data.

"Electromagnetic/seismic joint inversion in multilayered media," by Q. H. Liu et al. (see online presentation at: http://people.ee.duke.edu/~qhliu/Presentations/Liu_MURI_Review_Feb2004.pdf), presents a method wherein the measure is used to align the different data types while performing joint inversion.

The first three types of analyses are the most relevant for the present invention, although none of them teach a general statistical analysis framework for dealing with their technical problem.

SUMMARY OF THE INVENTION

In one embodiment, the invention is a method for evaluating a geoscience data analysis question, comprising: (a) inputting the data analysis question to a computer through a user interface, said data analysis question pertaining to one or more geophysical data elements; (b) using the computer to perform an automated derivation of a measure to evaluate the data analysis question; and (c) inputting the one or more geophysical data elements to the computer, computing the derived measure from the data elements, and using it to evaluate the data analysis question.

Typically, the geoscience data analysis question is one that, when answered, contributes to exploration for or production of hydrocarbons.

BRIEF DESCRIPTION OF THE DRAWINGS

The present invention will be better understood by referring to the following detailed description and the attached drawings in which.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

This invention provides a framework that gives geophysical data analysts (such as geologists and geophysicists) the ability to think of a multitude of questions that they would like to answer from the data and easily call upon a system to automatically, and in an adaptive manner, determine and compute what is needed to try answering those questions. One advantage of this framework is that it simplifies the geophysical data analysis process from the analyst's perspective. This is achieved by automating the process of determining an approach of how to answer the analysis question (the "transformation system" described below) and executing that approach to obtain a result (the below-described "computation system"). Thus, using the present inventive method, the user can focus exclusively on understanding the geologic and geophysical meaning and significance of the data, which is the ultimate goal of the analysis. The computational processes can, if desired, be transparent to the analyst.

Figure 1:
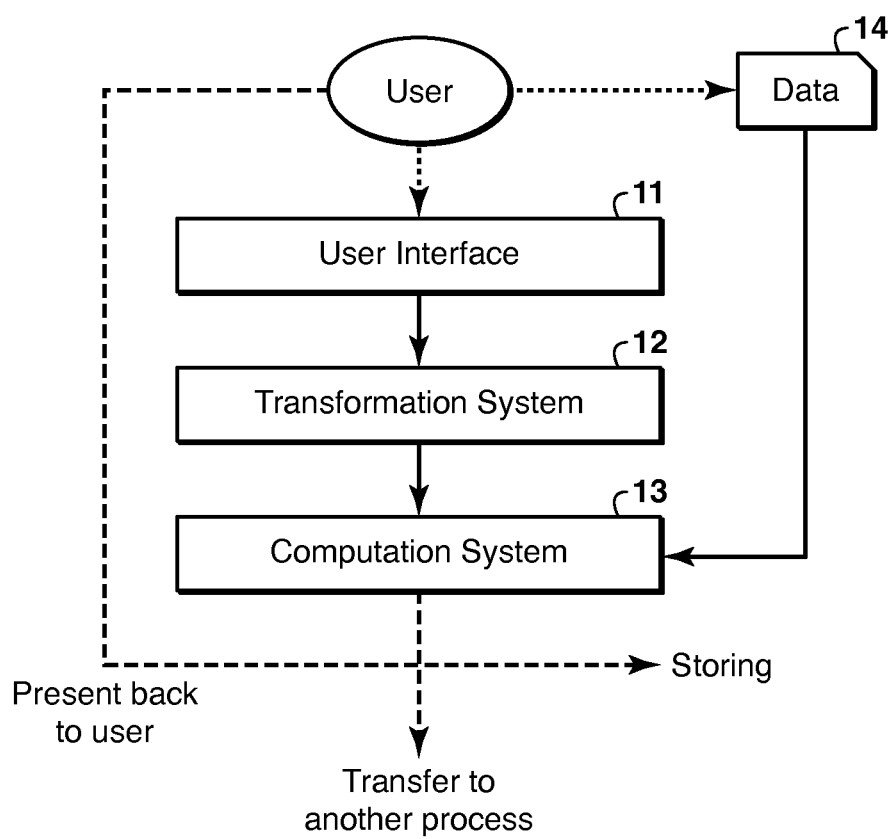
FIG. 1 is a flowchart showing basic steps in an embodiment of the present invention in which the user selects the data to be analyzed.

In at least one of its embodiments, the present inventive method comprises three main elements, as illustrated in the flowchart of FIG. 1: an interface 11 for the user to specify to a computer the question of interest, a transformation system 12, programmed into the computer, that automatically builds and implements a quantitative measure to try answering the user's question, and a computation system 13, also programmed into the computer, that computes that measure from the provided data 14. The results can then be presented back to the user, stored, or passed along to another process or system downstream, with or without conditioning. It is noteworthy that the user interface and the transformation system may be integrated into a single element in some embodiments of the invention.

The invention focuses on analyses that can be formulated from a statistical data analysis perspective. In other words, it is assumed that questions can be translated and answered quantitatively using a statistical quantity, called the measure above and elsewhere in this disclosure, to be calculated from the data. Furthermore, both the transformation and computation systems assume the availability of one or more predefined, or user-selected, base statistical measure (or base measures) from which the measure needed to try answering the question can be built. Thus, the transformation system may select from among its available base measures to build and calculate the measure that will be used to answer the user's question. For the purpose of this invention, a statistical measure is any quantity that reflects some element of the data statistics, regardless of whether the data statistics are used or accounted for explicitly in the measure's definition or implementation.

The User Interface

The user interface (UI) allows the user to specify the analysis question of interest. Consequently, it plays a major role in determining the flexibility of the method in the sense that it constrains which questions may be asked. By determining how questions must be posed, it also ultimately determines the user's perception of how easy it is to use the method. Thus, the present invention prefers interfaces that mimic the way the user naturally thinks about the question. An example interface is discussed later in this disclosure. In any case, the user may have his/her own ideas on the subject of the preferred interface for a given application.

Figure 2:
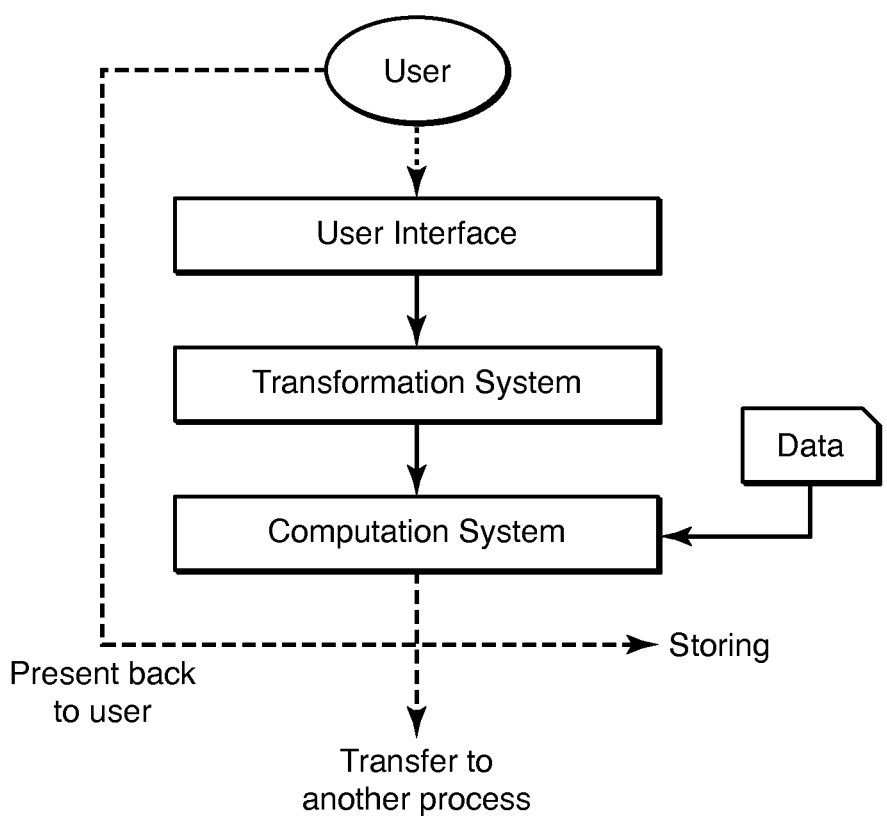
FIG. 2 is a flowchart showing basic steps in an embodiment of the present inventive method using pre-selected data.
Figure 3:
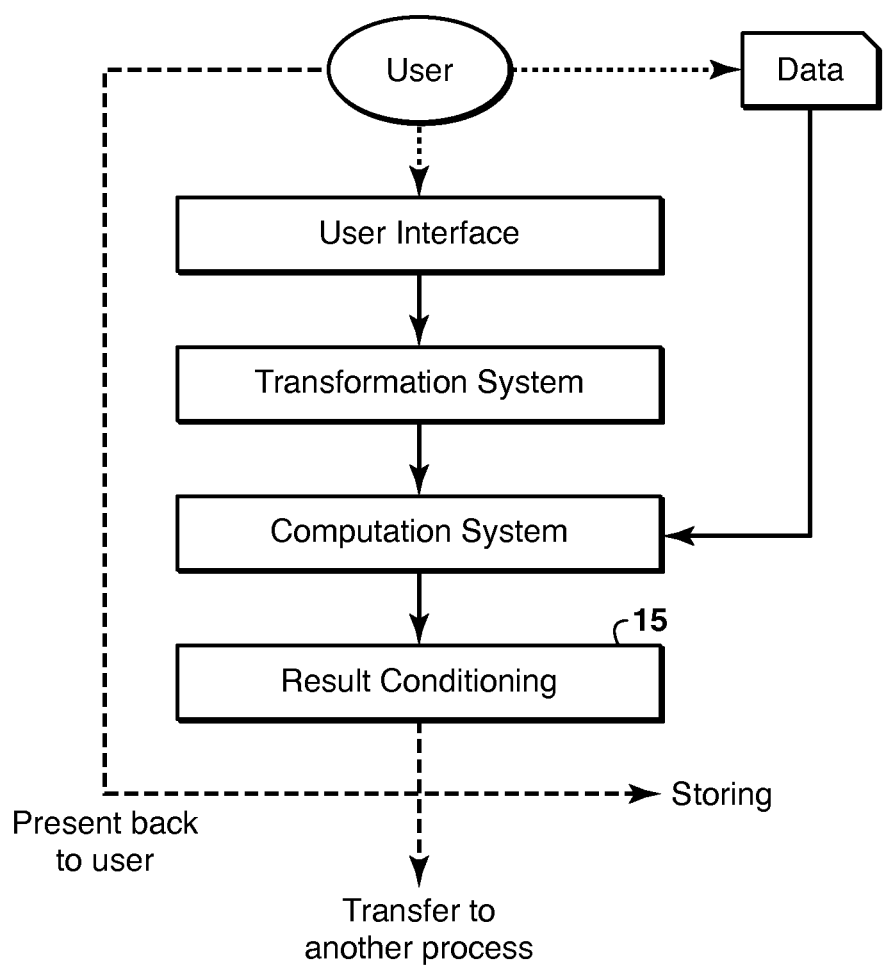
FIG. 3 is a flowchart showing the method of FIG. 1 with optional conditioning of the result added.

Depending on the specific embodiment of the inventive method that is selected, the user may also need to specify or select the data elements involved in the analysis (cf. FIG. 1 vs. FIG. 2). In FIGS. 1-3, dotted lines represent the user's input or selections, and dashed lines represent alternate possibilities. This data selection step may not be necessary, however, if a particular implementation or problem setting works on a fixed set of data, or if the data elements are direct products from another process.

The user interface can be designed in a large number of ways. In a typical design mode, it may take the form of a graphical user interface (GUI) or a text command in a predefined grammar, for example. User interfaces using speech recognition, or other human-computer interface modalities, can also be used. In comparison with a text command interface, a GUI interface has the advantage of being much more intuitive, thus making the invention easier and more attractive to use. On the other hand, a GUI interface can easily become very complex as the number of data elements increases. In contrast, a text command interface requires the user to learn the syntax of the commands, thus being less easy and intuitive to the user, but it is also much more powerful and allows for much more flexible data analysis scenarios.

The user interfaces can be implemented using a number of techniques available to a person skilled in the art. A GUI can be implemented using readily available GUI toolkits, such as GTK (http://www.gtk.org/), Qt (http://qt.nokia.com/), or wxWidgets (http://www.wxwidgets.org/). A text command interface can be implemented by directly coding a parser, if the structure of the commands is simple, or by using parser and lexical generator tools such as, for example, Yacc and Lex: http://en.wikipedia.org/wiki/Yacc and http://en.wikipedia.org/wiki/Lex_(software)

Typically, only one interface modality is present, and even if multiple modalities are available, they are preferably used independently. Nevertheless, different user interface modalities can also be coupled. For example, a GUI interface may generate a text command instead of interfacing directly with the transformation system, which may simplify the design of the GUI interface. In another example, a GUI interface can be used to graphically display a text command, which may be useful to verify that the command captures the intended analysis question.

Transformation System

The transformation system is a key element of the present inventive method. It takes the output of the user interface and automatically builds a measure to be computed from the data. More specifically, the transformation system transforms an input "command" (provided by the user interface) representative of the analysis problem that the user is interested in, into a computational process whose output can be used in trying to answer the question.

By serving as a translational bridge between the user and the computation system, the transformation system 12 helps to automate the computational process for the user and allows for a multitude of general questions to be asked. From the user's perspective, it allows for simplicity of use and for the user to focus on the question of interest. From the computation system's perspective, the transformation system is the engine that allows for the generality of the invention's framework because it determines the approach to answering the user's questions "on-the-fly." This is done by automatically formulating and implementing the statistical measure needed to try to answer the user's analysis problem.

In order for the transformation system to transform from the representation of the user interface to the representation of the computation system, it must be able to translate from one representation (that of the user interface) to the other (that of the computation system). Consequently, the specific form and implementation of the transformation system will depend on both the form of the output of the user interface and the base measure used by the computation system. The translation may occur without the need to actually understand the meaning of the command, i.e. the output of the user interface, as described above. In this case, the system relies instead on a dictionary or, more commonly, on a set of rules to map from one language to the other. Alternatively, the translation may require the system to actually understand the command, by inferring the meaning of what the user intends, and only then build the measure that evaluates that intent. The latter situation is likely to be necessary when the user interface system allows "ambiguous" commands, such as when natural language questioning is allowed. (In natural language questioning, the user may ask the system directly, "Is attribute A independent of attribute B?", for example.)

Computation System

The computation system is the element responsible for evaluating the measure specified by the transformation system. It achieves this goal by applying its implementation of the base measure to the data elements, sequentially or in parallel, and combining those computations into a result according to a workflow that may be indicated by the transformation system.

The measure may be calculated from the data elements in a global or local manner. In the global case, evaluating the derived measure yields a single value as a result of the calculation. In the local case, the data elements are sectioned into windows of data and the derived measure is calculated from each window. The windows may overlap and may cover only a region of the entire support of the data elements. By evaluating the derived measure, the process results in another "attribute," with dimensions determined by the number and location of windows, which answers the question with regards to a region (delineated by a window). This can be very important in detecting where some interesting confluences of attributes might be happening; for example, it might indicate that the attributes are highly interdependent in a portion of a seismic volume but not in other areas.

Albeit represented undirectionally in FIGS. 1-3, the specific form of interaction between the transformation and computation systems depends on the specific design or implementation. In some cases, the two systems may agree on a protocol to specify the computational workflow, and thus the computation system can implement and compute a new measure from the base measure (installed in the computation system beforehand) independently. In other cases, the transformation system may also be responsible for combining the computation results of the base measure, in which case the computation system reduces to an implementation of the base measure.

As an example, suppose that the computation system "knows" only how to add two numbers (the "base measure") and the transformation system needs to have three numbers added together. If the computation system is sophisticated enough to understand sequential summation, then the transformation system can just tell the computation system to add the first two numbers and then add the result to the third number. In an alternative embodiment, the transformation system needs to do the work of putting things together. So, the transformation system would have to tell the computation system to add the first two numbers together and get the result, and then the transformation system would give that result and the third number to the computation system and ask it to add them together, thus obtaining the result.

A number of base statistical measures may be implemented in the computation system. Typical examples of base statistical measures include, for example, variance and entropy (as the term entropy is used in information theory), or related measures, such as cross-covariance and mutual information. Note that these base measures have specific parameters or limitations and therefore, even though the user may be shielded from the computation details, the user might need to become knowledgeable about the computation details in order to interpret the analysis results. The system may be programmed to present these details in a monitor display on command.

The computation system may also implement several base statistical measures simultaneously, with the choice of which base measure to use being done by the user or, preferably, automatically by the transformation system. One consideration is that the transformation system will need to know how to use each of the possible base measures and how to combine them or how choose the most appropriate base measure for each case. Additionally, if appropriate, the transformation system may also be able to simultaneously leverage multiple base measures. Although the latter scenario would necessarily make the transformation system more complex, it would also allow even greater flexibility and for a derived measure to potentially compensate for limitations of the base measures. Also, in one aspect of the present disclosure, the computation system may implement all the measures directly or through sub-systems.

Optional Additional Elements

The previous sections introduce the three key elements that in one form or another are present in all embodiments of the present inventive method, but other elements may optionally be added. These optional elements may, for example, be used to facilitate the interpretation of the results or the integration of the framework with other workflows. Such an optional element is indicated by 15 in FIG. 3. One particular example of such an optional element is that the result may be normalized to facilitate interpretation or comparison of results by the user, or the result may be converted prior to storage (e.g., compression) or transferred to another process. Other optional elements may include, for instance, a module for conditioning the input data (e.g., denoising, normalizing, etc.) or a module to automatically suggest questions to further develop a data analysis question.

Next, a specific example of a preferred embodiment of the invention is presented. In this example, the data analysis question is whether two or more specified attributes of the data are interdependent instead of being independent of each other. A data attribute is a term of art meaning any quantity that can be computed from the data, but also including the data themselves, i.e. the data amplitude and/or phase.

User Interface

Figure 4A:
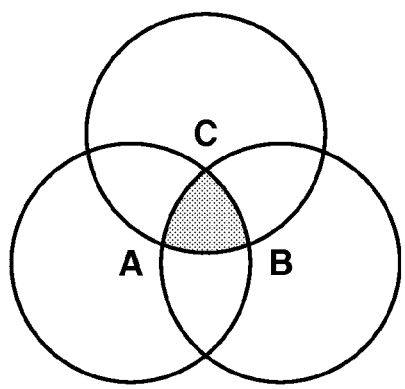
FIGS. 4A-4D show examples of a Venn diagram analysis interface with three input data sources denoting different analysis queries.
Figure 4B:
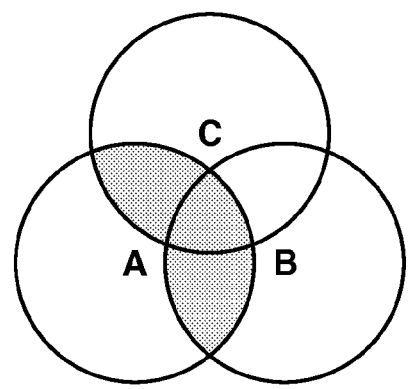
Figure 4C:
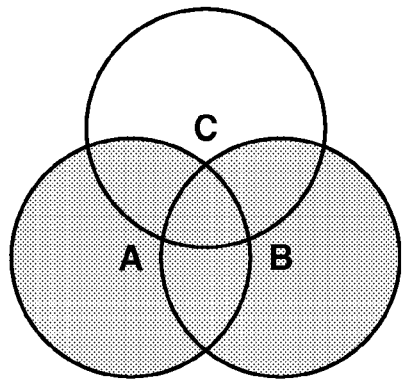
Figure 4D:
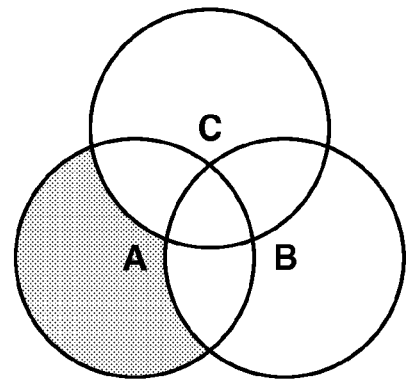

The key elements of a graphical user interface (GUI) design are how to indicate the attributes, and express the interdependencies between those attributes, that one is interested in analyzing. There are multiple ways to design this interface, but it may typically be a diagram of the attributes and the independencies that the user wishes to analyze. For example, a Venn diagram can be used to characterize interdependencies between attributes. This GUI is particularly adequate when the interdependencies are characterized through entropy and mutual information; see FIGS. 4A-4D for examples. In these drawings, a Venn diagram analysis interface with three input data sources denoting four different analysis queries are illustrated. FIG. 4A represents the interdependency between data sources A, B and C; FIG. 4B represents the interdependency between data source A and data sources B or C; FIG. 4C represents the information in A or B; and FIG. 4D represents the information contained exclusively in A.

Figure 5:
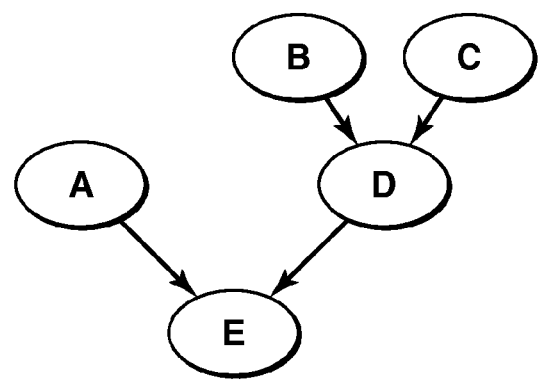
FIG. 5 shows an example of a graph structure analysis interface with three input data sources.

Another possibility is to use a graph structure in designing the GUI. In this approach, each attribute of interest is denoted through a "marker" in a "workspace," and then the potential interdependencies about which one wants to analyze or query are expressed through lines or arrow connections between markers as illustrated in the example of FIG. 5. The graph shown may be used to answer a two-step analysis question: are B and C interdependent and, if so, does A corroborate the interdependence of B and C.

Each approach has its advantages and disadvantages. For example, for a relatively small number of attributes, e.g. two or three, a GUI based on a Venn diagram is very straightforward and intuitive, because all possible types of interdependencies are directly shown to the user, and the user needs to select only the ones he's interested in. However, a Venn diagram interface quickly becomes highly complex with more attributes, and Venn diagrams with more than 6 attributes are hard to draw and almost unusable. On the other hand, an interdependence diagram can cope with more than 6 attributes but the interdependencies to be analyzed must all be explicitly inputted by the user, instead of directly shown, making the interface less straightforward and intuitive.

An alternative interface uses a text string to denote the expression characterizing the interdependency or combination of interdependencies that one is interested in analyzing. There are three base types of interdependency relationships: (1) information shared among entities, e.g. among data elements; (2) information in either/any one of the entities; and (3) information contained in one entity alone and not shared with any other entity. These three interdependency relationships provide the means to express any general interdependency. Information refers to the quantification of uncertainty within an attribute or of the interdependence between attributes and will take a specific meaning depending on the base measure used. For example, it may correspond to entropy or mutual information in an information theory sense, or to variance or correlation in a Gaussian statistics sense. Thus, information is what the data or attribute value means or expresses and not the value itself. The term entity is used herein to refer to a conceptual construct, which may for example be a data element, an interdependency of data elements, or combination of interdependencies of data elements. To build this interface, we can define a grammar of symbols denoting attributes and operations denoting their interdependencies. For instance, using set theory terminology, the above interdependencies can be expressed, respectively, by (1) the intersection of the entities (FIGS. 4A and 4B), (2) the union of the entities (FIG. 4C), or (3) the entity excluding the remaining (FIG. 4D). These interdependencies can be denoted through symbols, for example '&', '|', and '\', respectively.

For additional flexibility, the user interfaces may allow weights to be assigned to connections to, for example, obtain a desired scaling of the results or reflect the expected relative relevance. Furthermore, the interface may allow the user to specify a normalization factor, such as a scalar or other expression. This can be useful for analysis of the results.

It may be noted that, as mentioned earlier, the two types of user interfaces can be combined, with the GUI outputting its results in the form of a text string. This result may then be further manipulated or interfaced with before sending it to the transformation system.

Transformation System

In the example embodiment described here, it shall be assumed that a text output is issued from the user interface (GUI or text interface) and that Shannon's entropy is the base measure implemented in the computation system. Note that mutual information is referred to here only conceptually because, as it is shown, its computation involves the estimation of entropy terms. (A useful reference on information theory, and Shannon's entropy in particular, is *Elements of Information Theory*, by Thomas M. Cover and Joy A. Thomas, Wiley (2006), particularly sections 2.1-2.6 (pages 13-25)).

Suppose that the user is interested in the information shared by three attributes, 'A', 'B', and 'C', which is illustrated by the Venn diagram of FIG. 4A and can be represented by the expression 'A&B&C'. In Shannon's information theory, the information shared between attributes is their mutual information, $I(A,B,C)$, which can be calculated using entropies as, $$I(A,B,C)=H(A)+H(B)+H(C)-H(A,B)-H(A,C)-H(B,C)+H(A,B,C). \quad (1)$$

Here, "H" represents entropy. Hence, the mapping (i.e. transformation) system needs to know how to translate complex expressions given by the user, such as 'A&B&C', to quantities that can be calculated using the measure. Using the above notation ('&', '|', and '\') to denote attribute interdependencies that one would like to evaluate, and assuming Shannon's entropy will be used as the measure, the following transformation rules can be used:

$$A\&B \rightarrow A+B-(A|B)$$

$$A\backslash B \rightarrow (A|B)-B$$

$$A|(B+C) \rightarrow (A|B)+(A|C)$$

These correspond respectively to the definition of mutual information, conditional entropy (given not B), and the distributive property of joint entropy with regards to the arithmetic operations (i.e., sum or subtraction) of entities, respectively. The terms using only '|' do not need to be simplified because they map directly to the joint entropy of the entities. These equivalent relationships are very advantageous to use because it is very difficult to estimate mutual information or conditional entropies directly, but joint entropies can be estimated from data with relative ease.

By recursively applying the above rules and simplifying, it is possible to simplify any expression written using the above "set" and numerical operations and map it to an entropy expression that can be calculated using only joint and marginal distributions. [A marginal distribution is a distribution obtained from the joint distribution by "integrating out" one or more variables. Example: Let $f_{XYZ}(x, y, z)$ denote the joint distribution of random variables X, Y, and Z. Then the joint distribution of Y and Z, denoted $f_{YZ}(y, z)$, is a marginal distribution of $f_{XYZ}(x, y, z)$. Furthermore, the (marginal) distribution of Z or Y can be obtained from $f_{YZ}(y, z)$ or $f_{XYZ}(x, y, z)$. See also http://en.wikipedia.org/wiki/Marginal_distribution.] As an example, consider the mutual information of three attributes, denoted 'A & B & C', and depicted through a Venn diagram in FIG. 4A. Applying the above rules yields, $$A\&B\&C \rightarrow (A+B-(A|B))\&C$$

$$\rightarrow (A+B-(A|B))+C-((A+B-(A|B))|C)$$

$$\rightarrow A+B+C-(A|B)-(A|C)-(B|C)+(A|B|C)$$

which, translating each separate term denoting a union to an entropy calculation, results in $$I(A,B,C)=H(A)+H(B)+H(C)-H(A,B)-H(A,C)-H(B,C)+H(A,B,C). \quad (2)$$

Similarly, the rules can be applied to derive the computational definition of the measure in more general and complicated examples. For instance, consider the remaining cases depicted in FIGS. 4B-4D. FIG. 4B represents the interdependency between data source 'A' and data sources 'B' or 'C', and can be expressed as $$A\&(B|C) \rightarrow A+(B|C)-(A|(B|C))$$

$$\rightarrow A+(B|C)-(A|B|C)$$

which translates to the entropy measure, $$H(A)+H(B,C)-H(A,B,C).$$

FIG. 4C represents the information in 'A' or 'B' which maps directly to the union of 'A' and 'B', and thus to their joint entropy, H(A,B). FIG. 4D represents the information contained exclusively in 'A', that is, $$A\backslash (B|C)-(A|(B|C))-(B|C)$$

$$\rightarrow (A|B|C)-(B|C)$$

which translates to the entropy measure, $$H(A,B,C)-H(B,C).$$

These rules have been tested in a large number of examples, and verified to yield the correct implementation.

Additionally, note that it is possible to weight the terms differently, provided this is allowed by the user interface, as this is required internally anyway by some expressions. If weights are used, they can be applied simply using the distributive property with regards to sums and subtractions in the above rules.

Computation System

As stated earlier, this example embodiment uses Shannon's entropy as its base measure for computation. Accordingly, information shared by variables, for example, is measured using mutual information. Mutual information, or any of the above-mentioned interdependences, are difficult to compute directly, but can be calculated using multiple entropy calculations and entropy is readily computed. There are a number of advantages to the use of entropy as a base measure, such as the fact that it is shift-invariant, because adding a constant does not change its result, and the fact that it can fully capture the statistics of a random variable if non-parametric estimation methods are used. Intuitively, entropy is a measure of the amount of information required to describe that random variable. These advantages apply also to mutual information, which extends entropy into a similarity measure such that it can be used to compare the distribution of two random variables, for example, two seismic attributes. By comparing distributions instead of specific values, the mutual information between the two random variables can be non-linear. Also, mutual information is scale-invariant, meaning that it does not change if the random variables are scaled by an arbitrary (non-zero) value. An intuitive insight into the foregoing is that mutual information quantifies the reduction in uncertainty of a random variable given the knowledge of another random variable. Likewise, the advantages of entropy also apply to the other interdependence relationships.

These quantities are defined as follows. The entropy of a random variable X with probability density function ("pdf") p(x) is defined as, $$H(X)=-\Sigma_{x \in X} p(x) \log p(x),$$

and the joint entropy, the generalization of entropy to multiple random variables or multi-dimensional random variables, is defined as, $$H(X_1, X_2, \ldots, X_n) = -\Sigma_{x_1, x_2, \ldots, x_n} p(x_1, x_2, \ldots, x_n) \log p(x_1, x_2, \ldots, x_n). \quad (3)$$

The mutual information of two random variables can expressed in terms of entropy in any of the following ways:

$$I(X,Y)=H(X)-H(X|Y)$$

$$I(X,Y)=H(Y)-H(Y|X)$$

$$I(X,Y)=H(X)+H(Y)-H(X,Y)$$

$$I(X,X)=H(X) \quad (3)$$

The mutual information can be generalized inductively to more than two random variables using, $$I(X_1, \ldots, X_n) = I(X_1, \ldots, X_{n-1}) - I(X_1, \ldots, X_{n-1}|X_n) \quad (4)$$

where the conditional mutual information is defined as, $$I(X_1, \ldots, X_{n-1} \mid X_n) = \quad (5)$$

$$\int p_{X_n}(x_n) \int \ldots \int p_{X_1,\ldots,X_{n-1}\mid X_n}(x_1,\ldots,x_{n-1}\mid x_n) \log$$

$$\frac{p_{X_1,\ldots,X_{n-1}\mid X_n}(x_1,\ldots,x_{n-1}\mid x_n)}{\prod_{i=1}^{n-1} p_{X_i\mid X_n}(x_i\mid x_n)} dx_1, \ldots, dx_n.$$

Other definitions of multi-variate mutual information exist. Of those, perhaps the most common definition is, $$I(X_1, X_2, \ldots, X_n) = H(X_1) + H(X_2) + \ldots + H(X_n) - H(X_1, X_2, \ldots, X_n), \quad (6)$$

which is obtained by directly extending the third of Equations (3A) above for n random variables.

The two definitions coincide for n={1,2}. (This notation means that n is in the set { ... }; in this case, n=1 or 2.) The definition of mutual information given by equations (3) and (4) (they are equivalent) is used in this example embodiment, since this definition was assumed in the transformation rule described previously. To demonstrate its use beyond two random variables, equation (1) can be obtained from equation (4) for three random variables. The definition of mutual information in equation (6), or any other definition of dependency between random variables, could also be used provided that the transformation system is modified accordingly. Note that other entropy definitions could also be used, such as Rényi's family of entropies and related dependency measures (see, for example, J. C. Principe, *Information Theoretic Learning*, Springer, Chapter 2 (2010)).

The need to estimate the pdf of the random variable(s) is indicated in many of the above definitions. A number of non-parametric methods can be utilized for pdf estimation from data, such as Parzen windows, k-nearest neighbors, Gaussian mixture models, and data histograms. See, for example, R. Duda, P. Hart, and D. Stork, *Pattern Classification*, Wiley, $2^{nd}$ Ed., Chapter 4 (2000). The use of data histograms has the advantage of simplicity of implementation and use, and lower computational complexity; however, in that case, the estimation of joint entropy follows directly from the definition in equation (2) with the normalized data histogram (such that it sums to one) used as the estimate for the pdf p(x).

An alternative method in the present disclosure for estimation of mutual information uses the cross-correlation of the normal score-transformed random variables. Unlike the direct approach mentioned earlier which involves estimating the pdf density, this method uses the cumulative distribution function ("cdf") of the random variable. As a consequence, this method does not have free parameters and is easier and more stable to estimate. Consider random variables X and Y with cdfs $F_X(x)$ and $F_Y(y)$. Then $\tilde{X} = G^{-1}(F_X(X))$ and $\tilde{Y} = G^{-1}(F_Y(Y))$, where $G^{-1}$ is the inverse of the cdf of the standard normal distribution, are normal score-transformed random variables with zero mean and unit variance. Because $\tilde{X}$ and $\tilde{Y}$ are standard normal distributed random variables, their mutual information can be easily computed from their cross-correlation, $\rho = E[\tilde{X}\tilde{Y}]$, as $$I(\tilde{X}, \tilde{Y}) = -\frac{1}{2}\log(1-\rho^2)$$

And, because $G^{-1}(F_X(\cdot))$ and $G^{-1}(F_Y(\cdot))$ are continuous and uniquely invertible, the mutual information of $\tilde{X}$ and $\tilde{Y}$ is equal to the mutual information of X and Y. Note that in this alternative method, mutual information is calculated directly, i.e. without using entropy. This is an exception to previous observations about mutual information being generally difficult to calculate directly. However, this direct approach works only for two random variables, whereas previously described approaches are completely general.

Example Embodiment

An example embodiment of the entropy-based user interface and transformation system in Matlab is listed in the Appendix. The example has five files in the source code listing, some of which contain support functions that are invoked internally only by the main routine in the file.

A Venn diagram GUI is implemented by the file rv_rel_venn_gui.m. This interface was actually used to generate the images in FIGS. 4A-4D for the test example below (with some additional image editing for clarity). A text command interface is also provided, as implemented by the file parse_rv_expr.m, which parses the command into an internal structure amenable for processing by the transformation system. For simplicity, in this example embodiment, the GUI generates a text command to be parsed by parse_rv_expr instead of the internal structure directly.

The transformation system is implemented in the files simplify.m, apply_rv_rel_rules.m, and apply_union_distrib_rules.m. To use it, a user may invoke simplify with the structure obtained from parse_rv_expr, and apply_rv_rel_rules and apply_union_distrib_rules are invoked internally. These functions perform the actions described in the transformation system section description of the embodiment, resulting in a list where each element contains a scaling constant and the name of the attributes involved in joint entropy calculation for that term. The output_expr support function can be used to visualize the simplified expression.

The computation system implementing the entropy calculation is not detailed here because there are a large number of free or commercial implementations readily available to the user, for example those available in the commercial software product, Matlab.

Test Example

Figure 6A:
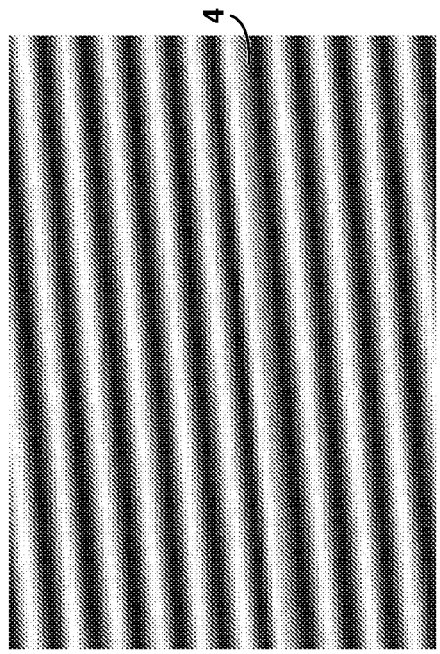
FIG. 6 shows the results of applying the present inventive method to two synthetic data sets.
Figure 6B:
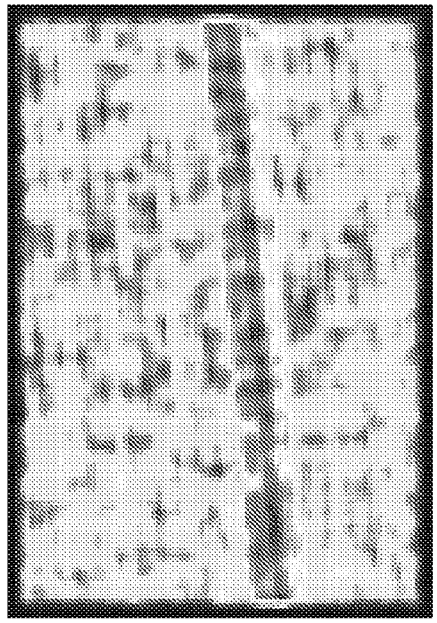
Figure 6C:
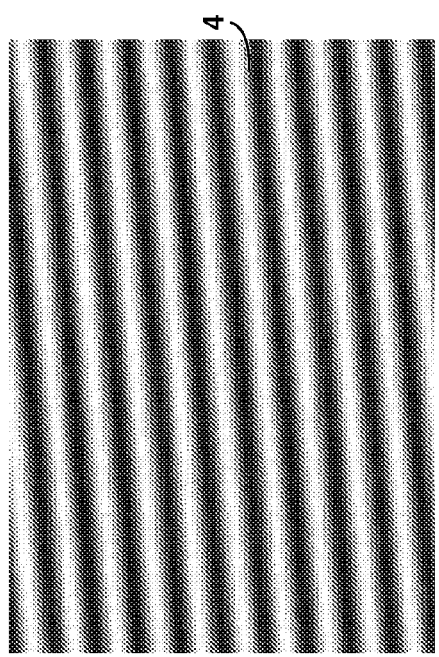

FIGS. 6A-6D illustrate an example of detection of differences in amplitude between two stacks of synthetic seismic data using the above-described example embodiment of the present inventive method. FIGS. 6A and 6B represent slices of two synthetically generated seismic amplitude stacks, representing the same x-z cross-section of a subsurface region. The two slices differ due to a small change in phase of the seismic data: close inspection shows that dark band 4 is slightly thicker in FIG. 6B than in FIG. 6A, but that difference is barely discernible visually, and might easily be overlooked in a visual inspection. In a real use setting, the two seismic stacks could have been obtained using different data migration steps or they could correspond to seismic surveys collected at different times for a time-lapse (4D) seismic study. Given their apparent close similarity, a possible data analysis question might be whether the data in FIG. 6B contains any information not contained in FIG. 6A. This can be important because if the two data elements contain the same information, then only one of the data elements needs to be considered for subsequent analysis (because the other data element does not bring anything new "to the picture"), thereby facilitating interpretation. In another example, such as the case of time-lapse seismic, that analysis question could highlight differences corresponding to changes in the subsurface, typically due to development or production, which can be very useful in characterizing the reservoir.

Figure 6D:
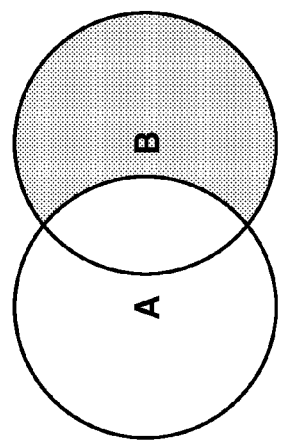

FIG. 4C shows the Venn diagram used for the user interface, expressing the data analysis question as being the information in 6B not contained in 6A, denoted 'B\A' in the software program listed in the Appendix. (In the implementation in the Appendix, this analysis question text command would be passed to the text interface implemented by parse_rv_expr for conversion into a structure that is passed to the transformation system.) Applying the second of the three transformation rules previously mentioned, as implemented in simplify, yields (A|B)–A, which corresponds to the calculation of H(A, B)–H(A) by the computation system. The computation system then performs a window-based estimation of the two entropy terms and takes their difference. The result from the computation system is shown in FIG. 6D, where red corresponds to a higher "amount of information" in B not contained in A and blue corresponds to lower information. As FIG. 6D demonstrates, application of the present inventive method has clearly highlighted the presence of the differences in structure indicated at 4 in FIGS. 6A and 6B.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

APPENDIX rv_rel_venn_gui.m

```
function s = rv_rel_venn_gui(n)
%RV_REL_VENN_GUI provides a GUI to specify the relationship between up to 3
%              random variables using a Venn diagram interface.
%
% Usage:
%       s = rv_rel_venn_gui(n);
%
% Inputs:
%       n: number of random variables involved {2,3}
%
% Outputs:
%       s: string of the relationship
%---------------------------------------------------------------------------
res = 600;
n = round(n);
if (n > 3) || (n < 2)
    error('Interface only supports up to 2-3 random vars for now.');
end
radius = 0.8;
if (n == 2)
    centers = [0 0; 1 0]';
    [xg yg] = meshgrid( ...
        [-1.25*radius : (1+2.5*radius)/((1+2.5*radius)*res-1) : 1+1.25*radius], ...
        [-1.25*radius : (2.5*radius)/(2.5*radius*res-1) : 1.25*radius]);
elseif (n == 3)
    centers = [0 0; 1 0; 0.5 -0.87]';
    [xg yg] = meshgrid( ...
        [-1.25*radius : (1+2.5*radius)/((1+2.5*radius)*res-1) : 1+1.25*radius], ...
        [-0.87-1.25*radius : (0.87+2.5*radius)/((0.87+2.5*radius)*res-1) : 1.25*radius]);
end
l = ['A' : 'Z'];
centersc = bsxfun(@plus, ...
        centers,   [1.25*radius; 1.25*radius+0.87*(n > 2)]) .* res;
%---------------------------------------------------------------------------
img = zeros(size(xg), 'single');
a = zeros([size(xg) n], 'single');
for i = 1:n
    aux = bsxfun(@minus, [xg(:) yg(:)]', centers(:,i));
    aux = reshape(sqrt(sum(aux.^2, 1)) - radius, size(xg));
    img = img | (abs(aux) <= 1/150);
    a(:,:,i) = (aux <= 0);
end
b = repmat(img > 0, [1 1 3]);
figure(99), clf, set(99, 'Color', [1 1 1]);
image(repmat(~img, [1 1 3])), axis image off
for i = 1:n
    text(centersc(1,i), centersc(2,i), l(i), ...
        'VerticalAlignment','middle', 'HorizontalAlignment','center');
end
disp('GUI started');
sel_area = [ ];
msg0 = 'Mouse click in an area to add/remove it, or press "q" to exit.';
msg = msg0;
while (1)
    title(msg), drawnow;
    [x y c] = ginput(1);
    x = x / res - 1.25*radius;
    y = y / res - 1.25*radius - 0.87*(n > 2);
```

```
    switch (c)
    case {27, 'q', 'Q'}
        break;
    case 1
        sel = zeros(1,n);
        for i = 1:n
            if (sum(([x; y] - centers(:,i)).^2) <= radius^2)
                sel(i) = 1;
            else
                sel(i) = -1;
            end
        end
        if all(sel < 0)
            msg = sprintf( ...
                '\\color{red}Invalid selection!\n\\color{black}%s', msg0);
            continue;
        end
        j = 0;
        for i = 1:size(sel_area,1)
            if all(sel == sel_area(i,:))
                j = i;
                break;
            end
        end
        if (j == 0)
            sel_area(end+1,:) = sel;
            msg = sprintf( ...
                '\\color{blue}Added relationship!\n\\color{black}%s', msg0);
        else
            sel_area(j,:) = [ ];
            msg = sprintf( ...
                '\\color{blue}Removed relationship!\n\\color{black}%s', msg0);
        end
        img = zeros(size(xg), 'single');
        for i = 1:size(sel_area,1)
            aux = ones(size(xg), 'single');
            for j = 1:n
                if (sel_area(i,j) > 0)
                    aux = aux & squeeze(a(:,:,j));
                else
                    aux = aux & ~squeeze(a(:,:,j));
                end
            end
            img = img | (aux > 0);
        end
        img = bsxfun(@times, repmat(img,[1 1 3]), permute([0.01 0.8 1],[1 3 2]));
        img(img == 0) = 1;
        img(b) = 0;
    otherwise
        msg = msg0;
    end
    figure(99), clf
    image(img), axis image off, title(msg);
    for i = 1:n
        text(centersc(1,i), centersc(2,i), 1(i), ...
            'VerticalAlignment','middle', 'HorizontalAlignment','center');
    end
end
if isempty(sel_area)
    t = [ ];
    s = [ ];
    return;
end
for i = 1:size(sel_area,1)
    for j = 1:size(sel_area,1)
        n = find(sel_area(i,:) ~= sel_area(j,:));
        if (numel(n) == 1)
            sel_area(i,n) = 0;
            sel_area(j,:) = 0;
        end
    end
end
sel_area(all(sel_area == 0,2),:) = [ ];
s = '';
for i = 1:size(sel_area,1)
    aux = sprintf('%c&', l(sel_area(i,:) > 0)); aux = aux(1:end-1);
    if isempty(s)
        s = ['(' aux ')'];
    else
```

```
        s = [s ' + (' aux ')'];
    end
    if any(sel_area(i,:) < 0)
        aux = sprintf('%c&', l(sel_area(i,:) < 0)); aux = aux(1:end−1);
        s = [s '\(' aux ')'];
    end
end
end
``` parse_rv_expr.m                                                                                    10

```
function toklst = parse_rv_expr(x, idx)
%  PARSE_RV_EXPR parses the input string.
%
%  This information will be later user to transform the expression into
%  another which can readily be used to compute the entropy of a relationship
%  between random variables using only joint and marginal entropies.
%
%  Usage:
%    t = parse_rv_expr(expr);
%
%  Inputs:
%    expr: input string
%       The input string may contain letters (denoting the random variables),
%       parentheses to enforce a specific precedence, and the operations
%       '+', '−', '*', '|', '&', and '\'. Each letter denotes one a random
%       variable. The characters '|', '&', and '\' denote "set" operations,
%       corresponding to union, intersection and exclusion, respectively.
%       That is, 'A|B', 'A&B', and 'A\B' correspond to the information
%       contained in A or B (i.e., the joint entropy), the information
%       contained in A and B (i.e., the mutual entropy), and the information
%       contained in A and not in B, respectively. The multiplication '*'
%       can only be used to indicate scaling of a set operation. Spaces are
%       neglected. (In cases of operations with equal precedence, e.g.,
%       '&' and '|', they are grouped from the end of the expression to the
%       beginning. For example, 'A|B&C' is equivalent to 'A|(B&C)', and
%       'A&B|C' is equivalent to 'A&(B|C)'.)
%
%  Outputs:
%    t: the parsed expression is represented by a list (i.e., structure array)
%       of tokens, each containing fields .tok and .w, corresponding to the
%       token term and the scaling term. Note that the operator does not need
%       to be stored explicitly since it is always '+' because a token is
%       delimited by ends of the expression and '+' and '−' but the '−'
%       operation is mapped to a sign flip of .w. The token terms contain a
%       single random variable or a binary tree with each node containing
%       three fields, 'x', 'y', and 'op', representing the operation (x op y).
%       Only '&', '|', and '\' are allowed in token terms.
%-------------------------------------------------------------------------
if (nargin < 1) || isempty(x) || ~ischar(x)
    return;
end
x = x(1,:); x = x(x ~= ' ');
nx = length(x);
if ~exist('idx','var') || isempty(idx)
    idx = [1 : nx];
else
    nx = max(idx);
end
maxtok = sum((x(idx) == '+') | (x(idx) == '−')) + 1;
toklst = repmat(struct('tok', [ ], 'w', 1), [maxtok 1]);
ARG  = 0;
OP   = 1;
NUM  = 2;
%-------------------------------------------------------------------------
ii = min(idx);
ti = 1;
while (ii <= nx)           % for each token
    expect = ARG;
    jj = ii;
    while (jj <= nx)
        if (expect == ARG)
            if ((x(jj) >= 'a') && (x(jj) <= 'z')) || ...
               ((x(jj) >= 'A') && (x(jj) <= 'Z'))
                expect = OP;
            elseif (x(jj) == '+') || (x(jj) == '−')
                expect = NUM;
```

```
        elseif (x(jj) >= '0') && (x(jj) <= '9') || (x(jj) == '.')
            jj = search_num_stop(x, jj);
            expect = OP;
        elseif (x(jj) == '(')
            n = jj + match_parentheses(x(jj : end)) – 1;
            if (n > nx)
                error(sprintf(['Parentheses mismatch!\n' ...
                    ' %%s\n %%%ds%%%ds'], jj, nx – jj), x, '^', '^');
            else
                jj = n;
                expect = OP;
            end
        else
            error(sprintf('Argument expected!\n %%s\n %%%ds',jj), x,'^');
        end
    elseif (expect == OP)
        if ~isempty(strfind('&|\*', x(jj)))
            expect = ARG;
        elseif (x(jj) == '+') || (x(jj) == '–')
            break;
        else
            error(sprintf('Operator expected!\n %%s\n %%%ds',jj), x,'^');
        end
    elseif (expect == NUM)
        if (x(jj) >= '0') && (x(jj) <= '9')
            jj = jj + search_num_stop(x(jj : end), jj) – 1;
            expect = ARG;
        else
            error(sprintf('Number expected!\n %%s\n %%%ds', jj), x, '^');
        end
    else
        error('Oops! Bug in the code...');
    end
    jj = jj + 1;
end
if (ii > min(idx)) && (x(ii–1) == '–')
    toklst(ti).w = –1;
end
token = remove_parentheses(x(ii : (jj–1)));
if ~ischar(token)
    error(sprintf('Parentheses mismatch!\n %%s\n %%%ds%%%ds', ...
        ii + token(1) – 1, token(2)), x, '^', '^');
end
n = min(strfind(x(ii : (jj–1)), token));
ii = ii + n – 1;
mi = find(token == '*');
if (numel(mi) > 1)
    error(['The code only supports one weight per token!\n %s\n ' ...
        sprintf('%%%ds', mi)], x, '^');
elseif (numel(mi) > 0)
    part_a = remove_parentheses(token(1 : (mi–1)));
    part_b = remove_parentheses(token((mi+1) : end));
    if ~ischar(part_a)
        error(sprintf('Parentheses mismatch!\n %%s\n %%%ds%%%ds', ...
            part_a(1) + ii – 1, part_a(2)), x, '^', '^');
    elseif ~ischar(part_b)
        error(sprintf('Parentheses mismatch!\n %%s\n %%%ds%%%ds', ...
            part_b(1) + ii + mi – 1, part_b(2)), x, '^', '^');
    else
        na = str2double(part_a);
        nb = str2double(part_b);
        if isnan(na) && isnan(nb)
            error(sprintf(['Syntax error: ' ...
                'cannot determine the weight term!\n' ...
                ' %%s\n %%%ds'], ii + mi – 1), x, '^');
        elseif isnumeric(na) && ~isnan(na)
            toklst(ti).w = toklst(ti).w * na;
            ii = ii + mi + min(strfind(token((mi+1) : end), part_b)) – 1;
            token = x(ii : ii+length(part_b)–1);
        elseif isnumeric(nb) && ~isnan(nb)
            toklst(ti).w = toklst(ti).w * nb;
            ii = ii + min(strfind(token(1 : (mi–1)), part_a)) – 1;
            token = x(ii : ii+length(part_a)–1);
        end
    end
end
if any((token == '+') | (token == '–'))
    % parse sub-expression
```

```
            aux = parse_rv_expr(x, (ii − 1) + [1 : length(token)]);
            for n = 1:numel(aux)
                aux(n).w = aux(n).w * toklst(ti).w;
            end
            toklst(ti : (ti+numel(aux)−1)) = aux;
            ti = ti + numel(aux);
        else
            toklst(ti).tok = parse_rv_rel_tt(x, (ii − 1) + [1 : length(token)]);
            ti = ti + 1;
        end
        ii = jj + 1;
    end
    toklst = toklst(1 : (ti−1));
return;
%=========================================================================
% Support functions
% ~~~~~~~~~~~~~~~~~~~~~~~~~~~~~~~~~~~~~~~~~~~~~~~~~~~~~~~~~~~~~~~~~~~~~~~~~
function args = parse_rv_rel_tt(x, idx)
    token = remove_parentheses(x(idx));
    ARG = 0;
    OP = 1;
    args = { };
    ops = '';
    expect = ARG;
    i = 1;
    while (i <= length(idx)) || ((i > length(idx)) && ~isempty(ops))
        if (i > length(idx))
            if (numel(args) < 2) || (numel(ops) ~= numel(args)−1)
                error(sprintf('Syntax error!\n %%s\n %%%%ds', idx(i)), x, '^');
            end
            aux = struct('x', args{end−1}, 'y', args{end }, 'op', ops(end));
            args = args(1:end−2);
            args{end+1} = aux;
            ops(end) = [ ];
        elseif (((x(idx(i)) >= 'a') && (x(idx(i)) <= 'z') ...
            || ((x(idx(i)) >= 'A') && (x(idx(i)) <= 'Z'))) && (expect == ARG)
            args{end+1} = x(idx(i));
            expect = OP;
            i = i + 1;
        elseif ~isempty(strfind('|&\', x(idx(i)))) && (expect == OP)
            ops(end+1) = x(idx(i));
            expect = ARG;
            i = i + 1;
        elseif (x(idx(i)) == '(') && (expect == ARG)
            n = 1;
            for j = (i+1):length(idx)
                if (x(idx(j)) == ')') && (n == 1)
                    t = parse_rv_rel_tt(x, idx((i+1) : (j−1)));
                    if ~isempty(t)
                        args{end+1} = t;
                    end
                    expect = OP;
                    break;
                elseif (x(idx(j)) == ')')
                    n = n − 1;
                elseif (x(idx(j)) == '(')
                    n = n + 1;
                end
            end
            if (expect == ARG)
                error(sprintf('Parentheses syntax error!\n %%s\n %%%%ds%%%%ds', ...
                    idx(i), idx(j−i) − idx(i)), x, '^', '^');
            end
            i = j+1;
        else
            error(sprintf('Syntax error!\n %%s\n %%%%ds', idx(i)), x, '^');
        end
    end
    if (numel(args) > 1)
        error('Syntax error! (leftover arguments)');
    end
    args = args{1};
return;
% ~~~~~~~~~~~~~~~~~~~~~~~~~~~~~~~~~~~~~~~~~~~~~~~~~~~~~~~~~~~~~~~~~~~~~~~~~
function n = match_parentheses(x)
    p = 1;
    n = 2;
    while (n <= length(x))
        if (p == 1) && (x(n) == ')')
```

```
        break;
    elseif (x(n) == '(')
        p = p + 1;
    elseif (x(n) == ')')
        p = p - 1;
    end
    n = n + 1;
end
return;
% ~~~~~~~~~~~~~~~~~~~~~~~~~~~~~~~~~~~~~~~~~~~~~~~~~~~~~
function y = remove_parentheses(x)
if (x(1) ~= '(')
    y = x;
else
    n = match_parentheses(x);
    if (n > length(x))
        y = [1 length(x)];
    elseif (n < length(x))
        y = x;
    else
        aux = remove_parentheses(x(2 : end−1));
        if ischar(aux)
            y = aux;
        else
            y = aux + 1;
        end
    end
end
return;
% ~~~~~~~~~~~~~~~~~~~~~~~~~~~~~~~~~~~~~~~~~~~~~~~~~~~~~
function n = search_num_stop(x, i0)
dot = false;
for i = i0 : length(x)
    if (x(i) == '.')
        if (~dot)
            dot = true;
        else
            error(sprintf('Syntax error!\n %%s\n %%%%ds', i), x, '^');
        end
    elseif (x(i) < '0') || (x(i) > '9')
        n = i − 1;
        return;
    end
end
n = length(x);
return;
``` simplify.m

```
function r = simplify(t)
%SIMPLIFY reduces (and sorts) an entropy computation expression.
%
% Usage:
%   r = simplify(t);
%
% Inputs:
%   t: token list
%
% Outputs:
%   r: simplified token list
%
% Note that, as part of the simplification process, apply_rv_rel_rules and
% apply_union_distrib_rules are applied. Hence, the RV relationships are
% expressed solely using joint distributions. Consequently, in the output
% token list, the joint distributions are represented only by an array of
% the RV letters included in the joint distribution.
%---------------------------------------------------------------------------
t = apply_rv_rel_rules(t);
t = apply_union_distrib_rules(t);
r = repmat(struct('tok',[ ], 'w',1), [1 256]);
nr = numel(t);
r(1:nr) = t;
i = 1;
while (i <= nr)
    if isstruct(r(i).tok) && (r(i).tok.op ~= '|')
        r(i+2 : nr+1) = r(i+1 : nr);
```

```
    if (r(i).tok.op == '+')
        r(i+1).w = r(i).w;
    elseif (r(i).tok.op == '-')
        r(i+1).w = -r(i).w;
    end
    r(i+1).tok = r(i).tok.y;
    r(i ).tok = r(i).tok.x;
    nr = nr + 1;
  else
    i = i + 1;
  end
end
r = r(1:nr);
for i = 1:numel(r)
  u = unique(distrib_from_AST(r(i).tok));
  r(i).tok = sort(u, 'ascend');
end
n = cellfun('length', {r.tok});
[n j] = sort(n, 'ascend');
r = r(j);
n = length(unique({r.tok}));
if (n ~= numel(r))
  i = 1;
  while (i <= numel(r))
    j = i + 1;
    while (j <= numel(r))
      if strcmp(r(i).tok, r(j).tok)
        r(i).w = r(i).w + r(j).w;
        if (r(i).w == 0)
          r([i j]) = [ ];
          j = i + 1;
        else
          r(j) = [ ];
        end
      else
        j = j + 1;
      end
    end
    i = i + 1;
  end
end
return;
% ============================================================
% Support function
function str = distrib_from_AST(t)
if ischar(t)
  str = t;
elseif isstruct(t) && isfield(t,'x') && isfield(t,'y') ...
       && isfield(t,'op') && (t.op == '|')
  str = [distrib_from_AST(t.x) distrib_from_AST(t.y)];
else
  error('Invalid argument!');
end
return;
``` apply_rv_rel_rules.m

```
function t = apply_rv_rel_rules(t0)
% APPLY_RV_REL_RULES applies rules to map intersection and exclusion of
%          random variables to sum, subtraction and union.
%
% This function is needed to obtain the expression to compute the random
% variables' entropy using only joint and marginal distributions.
%
% Usage:
%    t = apply_rv_rel_rules(t0);
%
% Inputs:
%   t0    : token list (e.g., from parse_rv_expr)
%
% Outputs:
%   t:    token list with the rules applied to it
%--------------------------------------------------------------------------
t = t0; clear t0
```

```
for i = 1:numel(t)
    if isstruct(t(i).tok)
        % the actual work is done in apply_rv_rel_rules_token,
        % which was designed to recurse on ASTs, rather than tokens
        t(i).tok = apply_rv_rel_rules_token(t(i).tok);
    end
end
return;
% ================================================================
% support function: apply the rules to one token
function t = apply_rv_rel_rules_token(t0)
t = t0; clear t0
% recurse
if isstruct(t.x), t.x = apply_rv_rel_rules_token(t.x); end
if isstruct(t.y), t.y = apply_rv_rel_rules_token(t.y); end
if (t.op == '&')
    % expand Intersection: x & y = (x + y) − (x | y)
    a = struct('x', t.x, 'y', t.y, 'op', '+');
    b = struct('x', t.x, 'y', t.y, 'op', '|');
    t = struct('x', a, 'y', b, 'op', '−');
elseif (t.op == '\')
    % expand exclusion: x \ y = (x | y) − y
    t.x = struct('x', t.x, 'y', t.y, 'op', '|');
    t.op = '−';
end
return;
``` apply_union_distrib_rules.m

```
function t = apply_union_distrib_rules(t0)
% APPLY_UNION_DISTRIB_RULES applies the distributive property of the union
%               operation with regards to the '+' and '−' operations.
%
% Usage:
%     t = apply_union_distrib_rules(t0);
%
% Inputs:
%     t0: token list (e.g., from parse_rv_expr)
%
% Outputs:
%     t: token list with the rules applied to it
%---------------------------------------------------------------------
t = t0; clear t0
for i = 1:numel(t) % for each token...
    if isstruct(t(i).tok)
        % the actual work is done in apply_union_distrib_rules_token,
        % which was designed to recurse on ASTs, rather than tokens
        t(i).tok = apply_union_distrib_rules_token(t(i).tok);
    end
end
return;
% ================================================================
% support function: apply the rules to one token
function t = apply_union_distrib_rules_token(t0)
t = t0; clear t0
while (1)
    % apply rule only if operation at current (top) level is union
    if (t.op == '|')
        if isstruct(t.x) && ((t.x.op == '+') || (t.x.op == '−'))
            a = struct('x',t.x.x, 'y',t.y, 'op','|');
            b = struct('x',t.x.y, 'y',t.y, 'op','|');
            t = struct('x',a, 'y',b, 'op',t.x.op);
        elseif isstruct(t.y) && ((t.y.op == '+') || (t.y.op == '−'))
            a = struct('x',t.x, 'y',t.y.x, 'op','|');
            b = struct('x',t.x, 'y',t.y.y, 'op','|');
            t = struct('x',a, 'y',b, 'op',t.y.op);
        end
    end
    s0 = output_expr(struct('tok',t, 'w',1));
    % recursively propagate distrib rules through the arguments
    if isstruct(t.x), t.x = apply_union_distrib_rules_token(t.x); end
    if isstruct(t.y), t.y = apply_union_distrib_rules_token(t.y); end
    s1 = output_expr(struct('tok',t, 'w',1));
```

```
      if strcmp(s0, s1)
          break;
      end
   end
return;
``` output_expr.m

```
function s = output_expr(p)
% OUTPUT_EXPR returns the expression string corresponding
%          to a parsed expression string.
%
% Usage:
%    s = output_expr(p);
%
% Input:
%    p: parsed expression string (i.e., the output of parse_rv_expr)
%
% Output:
%    s: string output with expression in pretty print format
%-------------------------------------------------------------------
s = '';
for i = 1:numel(p) % for each token
    if (p(i).w < 0)
        if (i > 1)
            s = [s ' - '];
        else
            s = [s '-'];
        end
        p(i).w = -p(i).w;
    elseif (i > 1)
        s = [s ' + '];
    end
    if (p(i).w ~= 1)
        s = [s num2str(p(i).w) '*'];
    end
    if isstruct(p(i).tok)
        s = [s '(' rv_string(p(i).tok) ')'];
    else
        s = [s rv_string(p(i).tok)];
    end
end
return;
%==================================================================
% support function
function s = rv_string(t)
if isstruct(t)
    x = rv_string(t.x);
    if isstruct(t.x) && (t.op ~= t.x.op)
        x = ['(' x ')'];
    end
    y = rv_string(t.y);
    if isstruct(t.y) && (t.op ~= t.y.op)
        y = ['(' y ')'];
    end
    s = [x ' ' t.op ' ' y];
elseif ischar(t)
    if (length(t) == 1)
        s = t;
    else
        s = sprintf('%c | ', t);
        s = ['(' s(1:end-3) ')'];
    end
end
return;
```

The invention claimed is:

1. A method for evaluating a geoscience data analysis question, comprising:

(a) inputting the data analysis question to a computer through a user interface, said data analysis question pertaining to one or more geophysical data elements;

(b) using the computer to perform an automated derivation of a measure to evaluate the data analysis question; and (c) inputting the one or more geophysical data elements to the computer, computing the derived measure from the data elements, and using it to evaluate the data analysis question.

2. The method of claim 1, wherein the user interface is a diagram graphical user interface or a text command interface.

3. The method of claim 1, wherein the user interface is a diagram graphical user interface based on a Venn diagram or based on graph structure.

4. The method of claim 1, wherein the measure is derived using one or more pre-defined base measures.

5. The method of claim 4, wherein the data analysis question concerns interdependency or lack thereof of two or more attributes computed from the one or more geophysical data elements.

6. The method of claim 5, wherein interdependency refers to one or more of three types of interdependency relationships: (i) information shared among the attributes, called mutual information; (ii) information in either one of the attributes; and (iii) information contained in one attribute but excluding that shared with any other attribute.

7. The method of claim 5, wherein the information comes from the computation of the derived measure from the attributes.

8. The method of claim 7, wherein the computation of the derived measure uses entropy as the base measure.

9. The method of claim 8, wherein the entropy measure is Shannon's entropy.

10. The method of claim 8, wherein entropy is estimated using a non-parametric density estimation method.

11. The method of claim 8, wherein both the interdependency and the derived measure are information shared among attributes, called mutual information, wherein the mutual information is computed using entropy.

12. The method of claim 11, wherein the mutual information of two or more attributes, represented as random variables $X_i$, are expressed in terms of:

the entropy H(X) of a single random variable X with probability density function p(x) defined as, $$H(X) = -\Sigma_{x \in X} p(x) \log p(x),$$

and joint entropy, a generalization of entropy to multiple random variables or multi-dimensional random variables, defined as, $$H(X_1, X_2, \ldots, X_n) = -\Sigma_{x_1, x_2, \ldots, x_n} p(x_1, x_2, \ldots, x_n) \log p(x_1, x_2, \ldots, x_n).$$

13. The method of claim 11, wherein the interdependency is based on mutuality of the information, and the mutual information is computed by cross-correlation of normal score-transformed random variables.

14. The method of claim 13, wherein mutual information is computed using entropy as the measure, and entropy of a random variable is computed from a cumulative distribution function of the random variable.

15. The method of claim 8, wherein the relationships $$A \& B \rightarrow A + B - (A|B)$$

$$A \backslash B \rightarrow (A|B) - B$$

$$A|(B+C) \rightarrow (A|B) + (A|C)$$

are used in order that computing the derived measure from the data elements is performed making joint entropy computations and no conditional entropy computations; wherein symbols &, |, and \ located between two attributes, represent, respectively, intersection of the two attributes, union of the two attributes, and an attribute excluding overlap with another attribute.

16. The method of claim 1, wherein the measure is a statistical measure consisting of one or more of variance and entropy, or their multi-attribute counterparts, cross-covariance and mutual information.

17. The method of claim 1, wherein the data analysis question has a multi-level structure wherein at each level the derived measure or second measure is computed from a different subset of the one or more geophysical data elements.

18. The method of claim 1, wherein the data analysis question is one of a group consisting of:
attribute selection;
evaluation of data quality;
deciding whether to combine two or more data sources; and
deriving a model that captures or enhances some desired characteristic of the data.

19. The method of claim 1, wherein computing the derived measure is performed in a local manner, using successive overlapping or non-overlapping windows of data elements.

20. The method of claim 19, further comprising using the computed derived measure for a plurality of windows for attribute analysis of a subsurface region represented by the data elements.

* * * * *